United States Patent Office 3,784,549
Patented Jan. 8, 1974

3,784,549
N-[2,3 - DIHYDROQUINOBENZOXAZEPIN - 3-YLIDENE]-O-(SUBSTITUTED CARBAMOYL) HYDROXYLAMINES
Harry L. Yale, New Brunswick, and Ramesh B. Petigara, Somerset, N.J., assignors to E. R. Squibb & Sons, Inc., Princeton, N.J.
No Drawing. Filed Aug. 13, 1971, Ser. No. 171,730
Int. Cl. C07d 39/00
U.S. Cl. 260—287 R
9 Claims

ABSTRACT OF THE DISCLOSURE 1,2-dihydroquinobenzoxa (or thia)zepine derivatives are provided having the structures

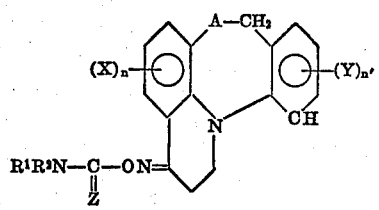

or

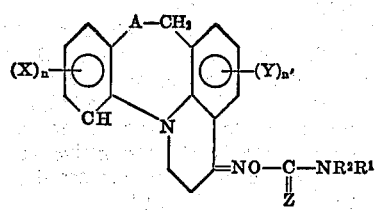

wherein A is O or S; Z is O or S; X and Y are the same or different and can be halogen, trifluoromethyl, lower alkyl, cycloalkyl, lower alkyl-mercapto, lower alkoxy, cyano, isocyanido, or di-lower alkysulfamoyl; $R^1$ and $R^2$ can be the same or different and are hydrogen, lower alkyl, aralkyl, aryl, arylsulfonyl or alkenyl; or $R^1$ and $R^2$ taken together with the nitrogen to which they are attached can be a heterocyclic radical having the formula

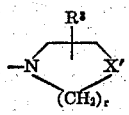

in which X' represents $NR^4$, O, S or $CH_2$, r represents 1, 2 or 3; $R^4$ represents hydrogen, lower alkyl, hydroxy-lower alkyl, lower alkanoyloxy-lower alkyl, hydroxy-lower alkoxy-lower alkyl, di(lower alkyl)amino-lower alkoxy-lower alkyl, lower-alkylamino-lower alkyl, di-lower alkyl amino-lower alkyl, amino-lower alkyl; $R^3$ represents any of the $R^4$ groups; n is 0, 1 or 2; n' is 0, 1, or 2, and pharmaceutically acceptable salts thereof. These compounds are useful as central nervous system stimulants, muscle relaxants, anti-inflammatory agents, and antibacterial agents.

The present invention relates to carbamoyl and thiocarbamoyl derivatives of 1,2-dihydroquinobenzoxa (or thia)zepine-3-one, oximes of the structure

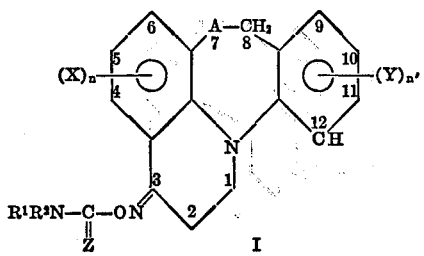

or

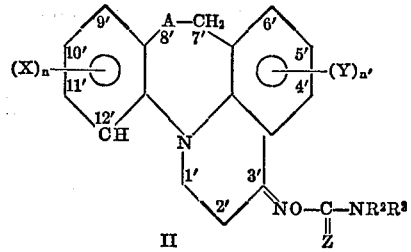

wherein Z is O or S, X and Y are the same or different and can be halogen, trifluoromethyl, lower alkyl, cycloalkyl, lower alkylmercapto, lower alkloxy, cyano, isocyanido or di-lower alkylsulfamoyl, A is O or S, n is 0, 1 or 2 and n' is 0, 1 or 2, and pharmaceutically acceptable acid-addition salts thereof, where possible.

The term "lower alkyl" as employed herein includes both straight and branched chain radicals of up to and including eight carbon atoms, for instance, methyl, ethyl, propyl, isopropyl, butyl, s-butyl, t-butyl, pentyl, hexyl, isohexyl, heptyl, 4,4-dimethylpentyl, octyl, 2,2,4-trimethylpentyl and the like.

The term "halogen" includes F Cl, Br or I.

The lower alkylmercapto groups contain up to eight carbon atoms and inclued methylmercapto, ethylmercapto, propylmercapto and mercapto radicals containing any of the lower alkyl groups mentioned hereinbefore.

The terms "lower alkyloxy" and "lower alkoxy" are interchangeable and refer to groups containing up to eight carbon atoms and which include any of the lower alkyl groups mentioned hereinbefore attached to an oxygen atom.

The term "cycloalkyl" includes saturated ring systems containing from three to seven carbons such as cyclopropyl, cyclobutyl, cyclopentyl, cyclohexyl and cycloheptyl.

The term "alkenyl" includes mono-unsaturated straight chain or branched chain radicals of less than eight carbons corresponding to "lower alkyl" as defined above.

The substituted amino groups include mono- or di-lower alkyl-, arylalkyl-, lower alkylaryl- or arylamino wherein lower alkyl and aryl are as defined herein, such as methylamino, ethylamino, isopropylamino, heptylamino, dimethylamino, diethylamino, ethylmethylamino, butylmethylamino, ethyl i-propylamino, anilino, benzylamino, diphenylamino, naphthylamino, or N-methyl-N-phenylamino and the like.

The term "aryl" as employed herein includes monocyclic carbocyclic aryl radicals, for instance, phenyl and substituted phenyl radicals, such as lower alkyl or alkoxy phenyl (e.g., o-, m-, or p-tolyl, ethylphenyl butylphenyl and the like), di(lower alkyl)phenyl (e.g., 2,4-dimethylphenyl, 3,5-diethylphenyl, and the like, and corresponding alkoxy compounds), halophenyl (e.g., chlorophenyl, bromophenyl, iodophenyl and fluorophenyl), o-, m- or p-nitrophenyl, dinitrophenyl (e.g., 3,5-dinitrophenyl, 2,6-dinitrophenyl, and the like), and trinitrophenyl (e.g., picryl), and aminophenyl, such as p-dimethylaminophenyl.

In the above Formulae I and II, each of the carbocyclic aromatic rings can include 0, 1 or 2 substituents, other than hydrogen. The nature and position of the substituents in the starting materials will determine which isomer, Type I and/or Type II, is obtained.

$R^1$ and $R^2$ may be the same or different and represent hydrogen, lower alkyl, aralkyl, aryl, arylsulfonyl and alkenyl; NR¹R² taken together is a heterocyclic radical having the formula

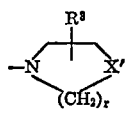

in which X' represents NR⁴, O, S or $CH_2$, $r$ represents 1, 2 or 3; R⁴ represents hydrogen, lower alkyl, hydroxy-lower alkyl, lower alkanoyloxy-lower alkyl, hydroxy-lower alkoxy-lower alkyl, di(lower alkyl)amino-lower alkoxy-lower alkyl, lower-alkylamino-lower alkyl, di-lower alkyl amino-lower alkyl,amino-lower alkyl; and R³ represents any of the R⁴ groups. These may be exemplified by piperidinyl; (lower alkyl)-piperidinyl [e.g., 2-, 3- or 4-(lower alkyl)piperidinyl]; (lower alkoxy)piperidinyl; pyrrolidinyl; (lower alkyl)-pyrrolidinyl; (lower alkoxy)pyrrolidinyl; piperazinyl; (lower alkyl)piperazinyl (e.g., N⁴-methylpiperazinyl); di(lower alkyl)piperazinyl; (lower alkoxy)piperazinyl; (hydroxylower alkyl)piperazinyl [e.g., N⁴ - (2 - hydroxyethyl)piperazinyl]; (lower alkanoyloxyalkyl)piperazinyl [e.g., N⁴-(2 - acetoxyethyl)piperazinyl]; (hydroxy-lower alkoxy-lower alkyl)piperazinyl [e.g., N⁴-[2 - (2 - hydroxyethoxy)ethyl]piperazinyl]; di-(lower alkyl)amino-(lower alkoxy-lower alkyl)piperazinyl [e.g., N⁴ - [2 - (2 - dimethylaminoethoxy)ethyl] piperazinyl]; homopiperazinyl; amino(lower alkyl) piperidinyl [e.g., 3-(aminomethyl)piperidinyl], lower alkylamino (lower alkyl)piperidinyl[e.g., 2-[(methylamino) ethyl]piperidinyl] di-lower alkylamino(lower alkyl) piperidinyl[e.g., 4-[(dimethylamino)methyl]piperidinyl].

The salts of the compounds of this invention include the acid-addition salts, particularly the non-toxic acid-addition salts. Acids useful for preparing the acid-addition salts, include inter alia, inorganic acids, such as the hydrohalic acids (e.g., hydrochloric and hydrobromic acid), sulfuric acid, nitric acid and phosphoric acid, and organic acids, such as oxalic, maleic, fumaric, tartaric, citric, pamoic, acetic, and succinic acid.

As will be seen hereinafter, the compounds of the invention are prepared from starting materials of the structure (III)

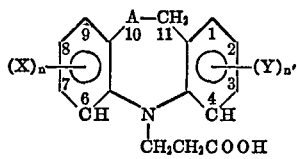

Where in the starting material III, $n$ is 1 or 2 and X includes a strongly electronegative group like trifluoromethyl, cyano, isocyanido or di-lower alkylsulfamoyl substituent at the 7-position, and $n'$ is 0, or Y is a substituent at a position other than 3 and 4 in the starting material, cyclization is directed to the 4-position so that the Type II isomer is subsequently formed. However, where X is an ortho-para orienting group like halogen, especially chlorine, and $n$ is 1 or 2 and at least one halogen is at the 7-position of starting material III, and Y is lower alkyl, lower alkyloxy, cycloalkyl or lower alkylmercapto at any position or a strongly electronegative group at a position other than 3, or when $n'$ is 0, a mixture of the Type I and Type II isomers is obtained.

Where in the starting material III, $n'$ is 1 or 2 and Y includes a strongly electronegative group like trifluoromethyl, cyano or di-lower alkylsulfamoyl at the 3-position, and $n$ is 0 or X is a substituent at a position other than 7 in the starting material, cyclization is directed to the 6-position so that the Type I isomer is subsequently formed.

Where in the starting material III, $n'$ is 1 or 2 and Y includes an ortho-para orienting substituent at the 3-position, and $n$ is 0, or X is a substituent at a position other than 7 in the starting material, cyclization is directed to the 6-position so that the Type I isomer is subsequently formed.

Where $n$ and $n'$ are 0, that is where there are no substituents on either aromatic ring, the Type I isomer is obtained, that is (IV)

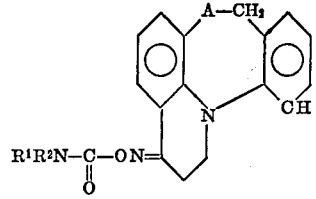

Where the starting material does not include substituents at the 3 and/or 7 positions, but does include substituents such as lower alkyl, lower alkyloxy, cycloalkyl or lower alkylmercapto at the 2, 8 and/or 9 positions, the Type I isomer is obtained.

Where the starting material does not include substituents at the 3 and/or 7 positions, but does include strongly electronegative groups at the 1 and/or 9 positions, the Type I isomer is obtained. However, where the starting material includes a strongly electronegative group at the 2 and/or 8 positions, then a mixture of the Type I and Type II isomers is obtained.

Where X represents a strongly electronegative group like trifluoromethyl, cyano or di-lower alkylsulfamoyl and $n$ is 1 or 2, at least one X being at the 7-position of the starting material and Y is lower alkyl, lower alkylmercapto, cycloalkyl or lower alkoxy at any position or any of the above strongly electronegative groups at a position other than 3 in the starting material and $n$ is 0, 1 or 2, the Type II isomer is obtained.

Where X is lower alkyl, lower alkyloxy, cycloalkyl, or lower alkylmercapto and $n$ is 1 or 2 and Y is halogen, trifluoromethyl, cyano, isocyanido or di-lower alkylsulfamoyl, and $n'$ is 1 or 2 at least one Y being at the 3-position of the starting material, the Type I isomer is obtained. In this case, X can be trifluoromethyl or other strongly electronegative group so long as it is not in the 7-position of the starting material so as will be seen hereinafter.

Where X is lower alkyl, lower alkyloxy, cycloalkyl or lower alkylmercapto, and $n$ is 1 or 2 and $n'$ in $(Y)_{n'}$ is 0, the Type I isomer is obtained.

Where Y is lower alkyl, lower alkyloxy, cycloalkyl or lower alkylmercapto and $n'$ is 1 or 2 and the $n$ in $(X)_n$ is 0, the Type II isomer is obtained.

Where both X and Y represent lower alkyl, lower alkoxy and/or lower alkylmercapto, at least one of said groups being at the 3 and 7 positions of the starting material, the Type I isomer is obtained.

Preferred are those compounds of Formula I wherein $n=0$ and $n'=0$ and A=O; those compounds of Formula I wherein $n=0$, $n'=1$ and Y is Cl at the 11-position, and $n=1$, $n'=0$ and X is Cl at 4 position and A=O and those compounds of Formula II wherein $n=1$, X is $CF_3$ or Cl at the 11'-position, $n'=0$, and A=O.

The compounds of the invention of Formulae I and II can be prepared by reacting an oxime of Formula V or VI

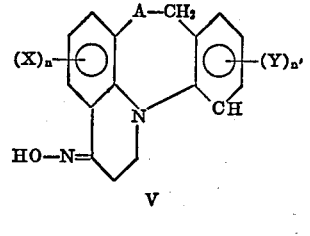

V or

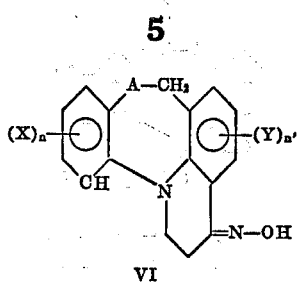

VI with phosgene or thiophosgene at a temperature within the range of from about 0° C. to about 100° C., employing a molar ratio of V or VI:phosgene or thiophosgene within the range of from about 0.1:1 to about 0.8:1 to form compounds of the structure

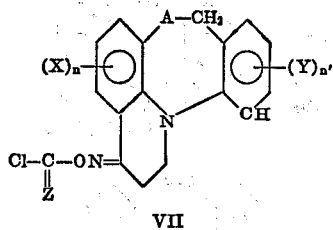

VII or

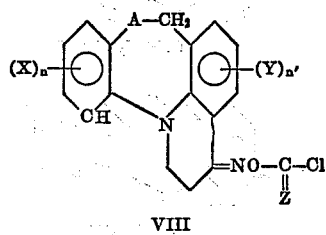

VIII and reacting compound VII and/or VIII with ammonia or a primary amine ($R^1NH_2$) or a secondary amine ($R^1R^2NH$).

Compounds of Formula I or II can also be prepared by reacting oxime V or VI with a substituted carbamoyl halide IX

     (IX)

wherein Q is Cl or Br, in the presence of a tertiary amine, at a temperature within the range of from about 20° C. to about 100° C., employing a molar ratio of V or VI:IX within the range of from about 0.5:1 to about 1:1, in a non-protic solvent.

Compounds of Formula I or II wherein one of $R^1$ or $R^2$ is hydrogen can be prepared by reacting oxime V or VI with an alkyl, aralkyl or aryl isocyanate ($R^1N=C=O$) or isothiocyanate ($R^1N=C=S$) at a temperature within the range of from about 20° C. to about 100° C., employing a molar ratio of oxime:cyanate of within the range of from about 0.8:1 to about 1:1.

Further, compounds of Formula I or II wherein one of $R^1$ or $R^2$ is hydrogen can be prepared by reacting oxime V or VI with an acid azide

at a temperature within the range of from about 20° C. to about 60° C., employing a molar ratio of oxime:azide within the range of from about 0.5:1 to about 0.8:1.

The 3-one, oxime starting materials (V and VI) of the invention can be prepared by reacting a compound of the structure (III)

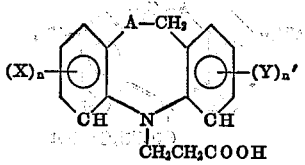

wherein X, Y, n, n', and A are as defined hereinbefore, with a phosphorus pentahalide, such as phosphorus pentachloride, in a molar ratio of III:pentahalide of within the range of from about 0.9:1 to about 1:1, in the absence of oxygen, and in the presence of an inert solvent, such as benzene, toluene, xylene, petane, hexane, etc., at a temperature within the range of from about 0 to about 10° C., to form an acyl halide of the structure (X)

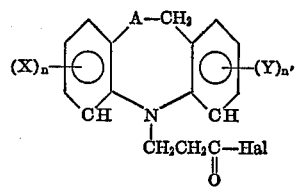

The acyl halide X is reacted with anhyrous stannic chloride in a molar ratio of acyl halide X:stannic chloride within the range of from about 0.4:1 to about 1:1, at a temperature within the range of from about 20° to about 30° C. to form the Formulas XI and XII 3 or 3'-one compounds depending upon the nature and the position of the X and Y substituents.

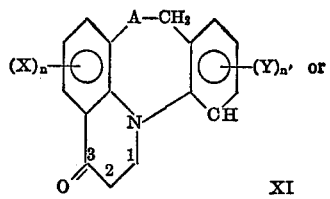

XI

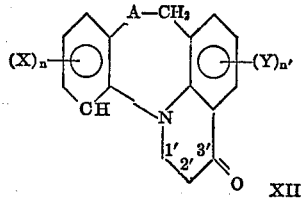

XII

The compounds of Formulas XI and/or XII can also be prepared by reacting the starting material (III)

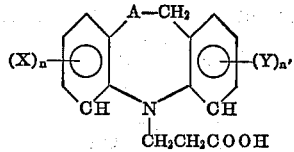

with trifluoroacetic anhydride or phosphorus pentoxide, in a molar ratio of III:trifluoroacetic anhydride, or phosphorus pentoxide of within the range of from about 0.9:1 to about 1:1, in the presence of an inert solvent such as benzenes, toluene, xylene, pentane, hexane, etc., at a temperature within the range of from about 10° to about 80° C., or with polyphosphoric acid (PPA) in a molar of III:PPA of within the range of from about 1:10 to about 1:25.

The ketones of Formulae XI and XII react with hydroxylamine or the hydrohalide salt thereof in the presence of a solvent such as ethanol, methanol, etc., to give the corresponding oxime starting materials (V and VI).

The starting materials of Formula III are prepared by a sequence of reactions. One step comprises reacting compounds having the formula:

(XIII)

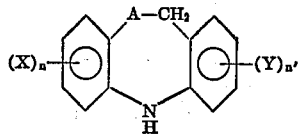

with acrylonitrile to yield compounds of formula (XIV)

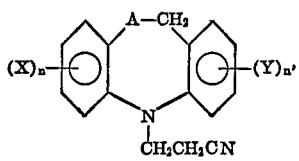

wherein n, n', X, Y and A are as defined herein.

This reaction is carried out by employing an excess of the acrylonitrile as the solvent. The temperature utilized in the reaction can be varied from about 0° to about 100° C. with the preferred range being between about 0° and about 75° C. This reaction proceeds expeditiously when a small amount (up to about 1%) of a strong base like sodium hydroxide, sodium methoxide, potassium t-butoxide, or benzyl trimethylammonium hydroxide (Triton B) is used as the catalyst.

The next step for preparing compounds of Formula III is to treat the compounds of structure XXV with alcoholic hydrogen halide, such as hydrogen chloride in methanol, ethanol, and so forth, at room temperature whereby esters of the structure XV are formed.

(XV)

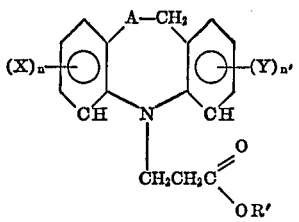

wherein R' is lower alkyl.

By saponifying compound XV with an alkali metal hydroxide, e.g., sodium hydroxide, lithium hydroxide, and so forth, the desired carboxylic acids of structure III can be recovered.

Examples of compounds of Formula XIII where A is S are set out in U.S. Pats. Nos. 3,188,321 and 3,188,322.

Examples of compounds of Formula XIV where A is O or S can be found in a paper entitled Novel Polycyclic Heterocycles, by Yale et al., J. Med. Chem. 13, 713 (1970).

Examples of starting materials which can be employed in preparing the compounds of the invention include, but are not limited to, the following wherein A can be O or S.

(1) 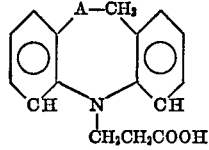

(2) 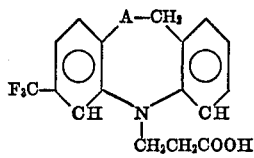

(3) 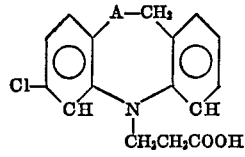

(4) 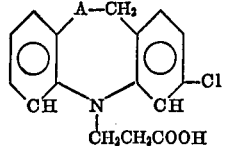

(5) 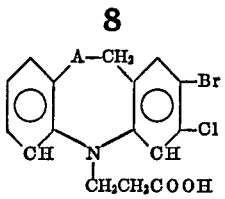

(6) 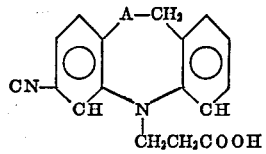

(7) 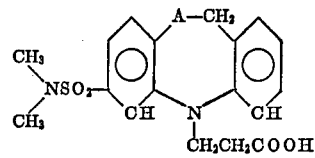

(8) 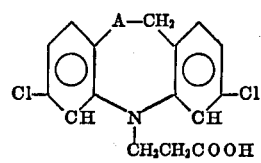

(9) 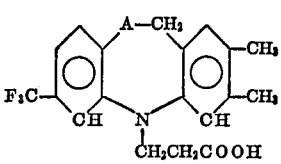

(10) 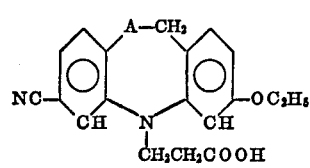

(11) 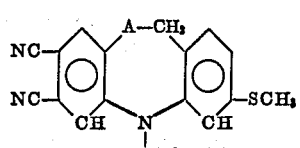

(12) 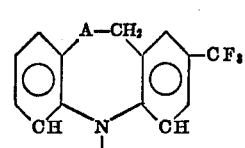

(13) 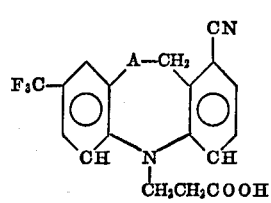

(14) 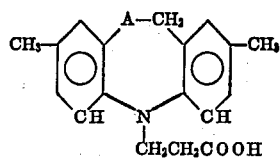

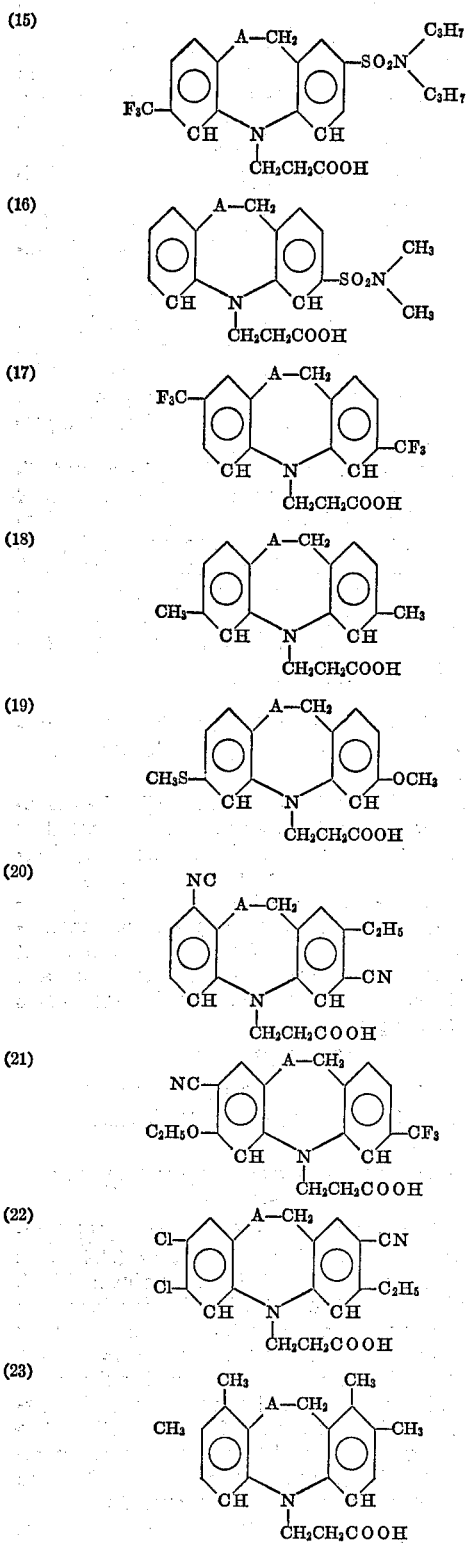

Compounds of this invention are therapeutically active compounds which are utilizable as central nervous system stimulants, as muscle relaxants and as anti-inflammatory agents. For these purposes, they may be administered orally or parenterally in such form as tablets, capsules, injectables, or the like by incorporating the appropriate dosage of the compound with carriers according to accepted pharmaceutical practices.

The new compounds of Formulae I and II are also useful as antimicrobial agents and may be used to combat infections in animal species, such as mice, rats, dogs, guinea pigs and the like, due to organisms such as *Trichomonas vaginalis, Trichomonas foetus, Staphylococcus aureus, Salmonella schottmuelleri, Klebsiella pneumoniae, Proteus vulgaris, Escherichia coli, C. albicans* or *Trichophyton mentagrophytes*. For example, a compound or mixture of compounds of Formulae I and II may be administered orally to an infected animal, e.g., to a mouse, in an amount of about 5 to 25 mg. per kg. per day in 2 to 4 divided doses. These may be conventionally formulated in a tablet, capsule or elixir containing about 10 to 250 mg. per dosage unit, by compounding the active substance or substances with the conventional excipient, vehicle, binder, preservative, flavor, etc., as called for by accepted pharmaceutical practice. They may also be applied topically, e.g., to dermatophytosis in a guinea pig, in a lotion, salve or cream at a concentration of about 0.01 to 3 percent by weight.

They may also be used as surface disinfectants. About 0.01 to 1 percent by weight of any of these substances may be dispersed on an inert solid or in a liquid such as water and applied as a dust or spray. They may be incorporated also, for example, in a soap or other cleansing agent, e.g., a solid or liquid detergent, detergent composition, for example, in general cleaning, in cleaning dairy barns or equipment or cleaning food handling or processing equipment.

The following examples illustrate the invention without, however, limiting the same thereto. All temperatures given are in degrees centigrade unless otherwise stated.

EXAMPLE 1

N-[2,3-Dihydro - 11 - (Trifluoromethyl) - 1H,7H - Quino-[8,1-cd][1,5]-Benzoxazepin - 3 - Ylidene] - O - (Phenylcarbamoyl)hydroxylamine (I) 1,2-dihydro-11-(trifluoromethyl)-3H,7H-quino-[8,1-c,d][1,5]benzoxazepin-3-one (A) 5,11-dihydro - 7 - (trifluoromethyl)dibenz[b,e]-[1,4]oxazepine-5-propionic acid.—To 50.0 g. of 5,11-dihydro - 7 - (trifluoromethyl)dibenz[b,e][1,4]oxazepine in 60 ml. of redistilled acrylonitrile is added in 5 minutes 0.80 ml. of Triton B. Subsequently, the mixture is heated for one hour under reflux and the product isolated by extraction with benzene to give 5,11-dihydro-7-(trifluoromethyl)dibenz[b,e][1,4]oxazepine - 5-propionitrile, M.P. about 161–163°.

7-(trifluoromethyl) - 5,11 - dihydrodibenz[b,e][1,4]-oxazepine-5-propionitrile, 15.0 g. is dissolved in 240 ml. of dry dioxane and to this 140 ml. of 30% methanolic hydrogen chloride is added. The solution is stirred for 36 hours, 6 ml. of H₂O is added, stirred 0.5 hour, and then concentrated in vacuo to 120 ml. The solid is filtered, and the filtrate is concentrated to dryness in vacuo. The residual liquid is taken up in 200 ml. of diethyl ether, treated with Darco and Hyflo, the diethyl ether solution is concentrated and the residue distilled in vacuo to give 5,11-dihydro - 7 - (trifluoromethyl)dibenz[b,e][1,4]oxazepine-5-propionic acid, methyl ester, B.P. about 166–168° (0.08 mm.), M.P. about 70.0–71.5°.

7-(trifluoromethyl) - 5,11 - dihydrodibenz[b,e][1,4]-oxazepine-5-propionic acid, methyl ester, 3.15 g., is dissolved in 315 ml. of methanol and to this 0.5 g. of potassium hydroxide dissolved in 25 ml. of water is added. The mixture is refluxed for 2.5 hours and then concentrated in vacuo. The residue is taken up in 250 ml. of water and this solution is acidified with 2% aqueous HCl to give 5,11-dihydro-7-(trifluoromethyl)dibenz[b,e][1,4] oxazepine-5-propionic acid, M.P. about 94–96°; this on recrystallization from hexane gives 2.8 g. of the product, M.P. about 105–107°.

(B) 1,2 - dihydro - 11 - (trifluoromethyl) - 3H,7H-quino[8,1-c,d][1,5]benzoxazepin - 3 - one.—A solution of 6.86 g. of 5,11-dihydro - 7 - (trifluoromethyl)dibenz-[b,e][1,4]oxazepine - 5 - propionic acid in 50 ml. of benzene is cooled to 5–10°. To this is added dropwise with stirring a solution of 4.6 g. of PCl₅ in 25 ml. of benzene over a period of 15 minutes. The solution is stirred at 25° for 40 minutes and then at 40–50° for another 20 minutes. The reaction mixture is then heated at 55° for 10 minutes, cooled to 10° and to this is added dropwise with stirring a solution of 12.0 g. anhydrous SnCl₄ in 20 ml. of benzene. After stirring 20 minutes at 10° and 20 minutes at room temperature, 100 ml. of ether are added, followed by 10 ml. of concentrated hydrochloric acid, and then 100 ml. of water. After stirring vigorously for 10 minutes, the organic phase is separated and the aqueous phase is extracted with 100 ml. of ether. The combined organic extracts are washed, dried, filtered, and concentrated to dryness to give 6.9 g. of residue; this is crystallized from 2-propanol to give 4.3 g. of product, M.P. about 140–142°.

(II) 1,2-dihydro-11-(trifluoromethyl)-3H,7H-quino[8,1-c,d][1,5]benzoxazepin-3-one, oxime A solution of 28.0 g. of the ketone from part I(B) and 13.6 g. of hydroxylamine hydrochloride in 600 ml. of warm 70% ethanol is refluxed for 4 hours and kept at room temperature to give a pale yellow crystalline solid. This is filtered and recrystallized from 70% ethanol to give 21.0 g. of the product, M.P. about 198–200° (dec.).

(III) N-[2,3 - dihydro -11 - (trifluoromethyl) - 1H,7H-quino[8,1-c,d][1,5]benzoxazepin - 3 - ylidene] - O - (phenylcarbamoyl)hydroxylamine A mixture of 5.0 g. of 1,2-dihydro - 11 - (trifluoromethyl) - 3H,7H - quino[8,1-c,d][1,5]benzoxazepine-3-one, oxime, 1.8 g. of phenyl isocyanate, and 1.2 g. of pyridine in 50 ml. of benzene is heated under reflux for about 1 hour. The reaction mixture is cooled and filtered to give 7.0 g. of a solid that is recrystallized from 400 ml. of benzene to give 5.7 g. of the product, M.P. about 216–218° (dec.).

EXAMPLE 2

N-[11 - chloro - 2,3 - dihydro - 1H,8H - quino[1,8-a,b]-[4,1]benzothiazepin - 3 - ylidene] - O - (p - dimethylaminophenylcarbamoyl)-hydroxylamine By following the procedure of Example 1, but replacing 1,2 - dihydro - 11 - (trifluoromethyl)-3H,7H-quino-[8,1-c,d][1,5]benzoxazepin - 3 - one, oxime and phenyl isocyanate with 11 - chloro - 1,2 - dihydro - 3H,8H-quino[1,8a,b][4,1]benzothiazepin - 3 - one, oxime and p-dimethylaminophenyl isocyanate, respectively, there is obtained the title product.

11 - chloro - 2,3 - dihydro - 1H,8H - quino[1,8-a,b] benzo-thiazepine - 3 - one, oxime is prepared as follows.

(A) 3 - chloro - 5,11 - dihydrodibenzo[b,e][1,4]thiazepine - 5 - propionic acid.—A suspension of 24.6 g. of 3 - chloro - 5,11 - dihydrodibenzo[b,e][1,4]thiazepine in 55 ml. of acrylonitrile is cooled to 0–5°. To this is added dropwise 0.3 ml. of Triton B. The temperature rises slowly from 3° to 14° and then rapidly to 45° within 5 minutes with the formation of red colored clear solution. The mixture is cooled to 5–10°, stirred for 5 minutes, allowed to come to room temperature and then heated under reflux for 1.5 hours. The excess of acrylonitrile is removed in vacuo; the residue is extracted with 3–350 ml. portions of diethyl ether; the combined ether extracts are decolorized and concentrated to give 31.6 g. of 3 - chloro - 5,11 - dihydrodibenzo[b,e][1,4]thiazepine-5-propionitrile, B.P. about 205–210° (0.2 mm.).

To the 3 - chloro - 5,11 - dihydrodibenzo[b,e][1,4] thiazepine - 5 - propionitrile, 71.1 g., in 1200 ml. of dry dioxane is added 800 ml. of 30% methanolic hydrogen chloride. The solution is stirred for 72 hours; 30 ml. of water is added; the mixture is stirred for 0.5 hours, concentrated in vacuo to about 400 ml., filtered, and the filtrate concentrated to dryness in vacuo. The residue solidifies on keeping to yield methyl 3-chloro - 5,11 - dihydrodibenzo[b,e][1,4]thiazepine-5-propionate.

To the methyl 3 - chloro - 5,11 - dihydrodibenzo-[b,e][1,4]thiazepine - 5 - propionate, 25.4 g., in 2200 ml. of methanol is added a solution of 5.6 g. of potassium hydroxide in 300 ml. of water. The mixture is heated under reflux for 4 hours and then is concentrated in vacuo. The residue is taken up in 600 ml. of water, cooled, and then acidified with 2% aqueous hydrochloric acid. The solid is filtered and recrystallized from benzene to yield 3 - chloro - 5,11 - dihydrodibenzo[b,e][1,4]thiazepine-5-propionic acid.

(B) 11 - chloro - 1,2 - dihydro - 3H,8H - quino[1,8-a,b][4,1]benzothiazepin - 3 - one.—3-chloro - 5,11 - dihydro[b,e][1,4]thiazepine - 5 - propionic acid, 3.7 g., is dissolved in 20 ml. of benzene and to the solution at 20° is added dropwise, 2.8 g. of trifluoroacetic anhydride. The reaction mixture is heated under reflux for 5 minutes, poured into 250 ml. of cold water, and extracted with 150 ml. of benzene. The benzene solution is concentrated to dryness and the residue is recrystallized from 2-propanol to give about 2.3 g. of product.

(C) 11 - chloro - 1,2 - dihydro - 3H,8H - quino[1,8-a,b][4,1]benzothiazepin - 3 - one, oxime.—A solution of 28.0 g. of 11 -chloro - 1,2 - dihydro - 3H,8H - quino-[1,8-a,b][4,1]benzothiazepin - 3 - one and 13.6 g. of hydroxylamine hydrochloride in 600 ml. of warm 70% ethanol is refluxed for 4 hours and kept at room temperature to give a pale yellow crystalline solid. This is filtered and recrystallized from 70% ethanol to give 21.0 g. of the oxime.

EXAMPLE 3

N - [2,3 - dihydro - 1H,8H - quino[1,8-a,b][4,1]benzoxazepin - 3 - ylidene] - O - (p-nitrophenylthiocarbamoyl) hydroxylamine A mixture of 4.7 g. of 1,2 - dihydro - 3H,8H - quino-[1,8-a,b][4,1]benzoxazepin - 3 - one oxime, prepared as described in Example 1, parts I and II, employing 5,11-dihydrodibenzo[b,e][1,4]oxazepine as the starting material in lieu of 5,11 - dihydro - 7 - (trifluoromethyl)-dibenzo[b,e][1,4]thiazepine, 2.5 g. of p - nitrophenylisothiocyanate and 20 ml. of pyridine is heated at about 95° for 1 hour. The solvent is removed in vacuo and the semi-solid residue is crystallized from hexane to give about 3.4 g. of the product.

EXAMPLE 4

N-[11-Chloro-2,3 - Dihydro-1H,8H-Quino[1,8-a,b][4,1] Benzoxazepin - 3 - Ylidene] - O - (Methylcarbamoyl) Hydroxylamine (I) 11-chloro-1,2-dihydro-3H,8H-quino[1,8-a,b][4,1] benzoxazepin-3-one (A) 3 - chloro - 5,11 - dihydrodibenz[b,e][1,4]oxazepine-5-propionic acid.—A suspension of 24.4 g. of 3-chloro-5,11-dihydrodibenz[b,e][1,4]oxazepine in 55 ml. of acrylonitrile is cooled to 0–5°. To this is added with efficient stirring and cooling, 0.3 ml. of Triton B, pausing after each drop of addition. The temperature rises slowly from 3° to 14° and then rapidly to 45° within 5 minutes with the formation of red colored clear solution. The mixture is cooled to 5–10°, stirred for 5 minutes, allowed to come to room temperature and then slowly heated to reflux temperature. After 1 hour heating under reflux, the excess of acrylonitrile is removed in vacuo. The residue is extracted with 3–350 ml. portions of diethyl ether, the combined diethyl ether extracts are treated with 3.0 g. of Darco and 1.0 g. of Hyflo, filtered, the filtrate is dried and concentrated to give 31.6 g. of 3-chloro-5,11-dihydrodibenz[b,e][1,4]oxazepine - 5 - propionitrile, B.P. about 200–210° (0.2 min.).

The 3 - chloro-5,11-dihydrodibenz[b,e][1,4]oxazepine-5-propionitrile, 71.10 g., is dissolved in 1200 ml. of dry dioxane and to this 800 ml. of 30% methanolic hydrogen chloride is added. The solution is stirred for 72 hours, 30 ml. of H₂O is added, the mixture is stirred for 0.5 hour, concentrated in vacuo to 400 ml. filtered, and the filtrate concentrated to dryness in vacuo. The residue solidifies on keeping to yield 3-chloro-5,11-dihydrodibenz[b,e][1,4]-oxazepine-5-propionic acid, methyl ester.

The 3 - chloro - 5,11 - dihydrodibenz[b,e][1,4]oxazepine-5-propionic acid, methyl ester, 25.4 g., is dissolved in 2200 ml. of MeOH and to this 5.6 g. of KOH dissolved in 300 ml. of H₂O is added. The solution is refluxed for 4 hours and then is concentrated in vacuo. The residue is taken up in 600 ml. of H₂O, the solution is cooled, and then acidified with 2% aqueous HCl. The solid is filtered and dissolved in 600 ml. of C₆H₆. This solution is treated with Darco and then extracted with 600 ml. of 2% aqueous NaOH solution. The extracts are treated with Darco and Hyflo, filtered and the filtrate is acidified with 2% aqueous HCl. The solid is filtered and recrystallized from C₆H₆ to yield 3-chloro-5,11-dihydrodibenz[b,e][1,4]oxazepine-5-propionic acid, M.P. about 138–140°.

(B) 11 - chloro - 1,2-dihydro-3H,8H-quino[1,8-a,b][4,1]benzoxazepin-3-one.—3.7 g. of 3-chloro-5,11-dihydro[b,e][1,4]oxazepin-5-propionic acid is dissolved in 20 ml. of warm benzene and the resulting colorless solution is allowed to come to 30° and to this, 1.9 ml. (2.8 g.) of (CF₃CO)₂O is added dropwise. The reaction mixture is slowly heated to reflux, the reflux is maintained for 5 minutes and the mixture is poured into 250 ml. of cold water. To this, 150 ml. of benzene is added and stirred for a few minutes. The benzene layer is separated, washed, dried, filtered, and concentrated to dryness. The residue is recrystallized first from 2-propanol and then from cyclohexane to give 2.3 g. of product, M.P. about 142–144°.

(II) 11-chloro-1,2-dihydro-3H,8H-quino[1,8-a,b][4,1]benzoxazepin-3-one, oxime

A solution of 11.1 g. of the ketone from Example 4(B) and 0.54 g. of hydroxylamine hydrochloride in 40 ml. of 70% ethanol is refluxed for 4 hours, cooled and the solid filtered. The solid is recrystallized from 70% ethanol to give 800 mg. of product, M.P. about 158–161° (dec.).

N - [11 - Chloro - 2,3 - Dihydro-1H,8H-Quino[1,8-a,b][4,1]Benzoxazepin - 3 - Ylidene] - O - (Methylcarbamoyl)Hydroxylamine To a solution of 6.0 g. of 11-chloro-1,2-dihydro-3H,8H-quino[1,8-a,b][4,1]benzoxazepin - 3 - one, oxime, in 200 ml. of toluene is added 4.0 g. of triethylamine and the mixture is cooled to 5°. To this, while stirring, is added dropwise a solution of 4.0 g. of phosgene in 30 ml. of toluene. The reaction mixture is stirred overnight at 25° and filtered. The filtrate is concentrated to dryness in vacuo to give 7.1 g. of a liquid residue that is dissolved in 20 ml. of methylamine and the mixture heated at 80° for about 7 hours in a sealed tube. The mixture is concentrated to dryness in vacuo and the residue is dissolved in 300 ml. of ether. The ether solution is washed, dried, and concentrated to dryness to give 6.3 g. of residue. This is recrystallized from hexane to give 4.9 g. of product.

EXAMPLE 5

N - [4 - chloro - 2,3- dihydro- 1H,8H-quino[1,8-a,b][4,1]benzoxazepine - 3 - ylidene] -O - (diphenylcarbamoyl)hydroxylamine A solution of 6.0 g. of 4 - chloro - 1,2 - dihydro-3H,8H - quino[1,8-a,b][4,1]benzoxazepin - 3 - one, oxime, 4.62 g. of diphenylcarbamyl chloride and 2.0 g. of pyridine in 200 ml. of anhydrous benzene is heated under reflux for 5 hours. The solution is filtered and the filtrate is washed with 10% potassium bicarbonate (40 ml. portions) three times, and with water (40 ml. portions) five times. The benzene layer is dried and concentrated to dryness in vacuo. The solid residue is crystallized from ethanol to give 3.9 g. of the crystalline product. The oxime is prepared employing the procedure of Example 4 with the exception that 7 - chloro - 5,11 - dihydrodibenz[b,e][1,4]oxazepine is employed in lieu of the corresponding 3-chloro compound.

EXAMPLE 6

N - [2,3 - dihydro - 1H,8H - quino[1,8-a,b][4,1]benzothiazepin - 3 - ylidene] - O - (p - fluorophenylcarbamoyl)hydroxylamine A mixture of 5.6 g. of 1,2-dihydro - 3H,8H - quino[1,8-a,b][4,1]benzothiazepin - 3 - one, oxime, prepared as in Example 3, and 4.0 g. of p-fluorobenzazide in 200 ml. of ligroin is heated under reflux for 3 hours and cooled to give 6.7 g. of crystalline solid. This is recrystallized from benzene to give 5.8 g. of product.

EXAMPLES 7 TO 16

Employing the procedures described in Example 1, but substituting the starting material shown in Column A of Table I below, by reacting the 3-one, oxime, in Column B is obtained; by reacting the 3-one, oxime, with the compound shown in Column C as per Example 1, part III, the product shown in Column D is obtained.

TABLE I

| Example number | Column A<br>Starting material | Column B<br>3 or 3'-one, oxime | Column C<br>R'N=C=Z | Column D<br>Product |
|---|---|---|---|---|
| 7 | (structure with S-CH₃, F₃C, OH, CH₂CH₂COOH) | (structure with S-CH₃, F₃C, OH, =NOH) | CH₃N=C=O | (structure with S-CH₃, F₃C, =N-O-C(O)-NHCH₃) |

3,784,549

TABLE I—Continued

| Example number | Column A<br>Starting material | Column B<br>3 or 3′-one, oxime | Column C<br>R′N=C=Z | Column D<br>Product |
|---|---|---|---|---|
| 8 | [structure] | [structure] | CH₃N=C=S | [structure] |
| 9 | [structure] | [structure] | C₆H₅N=C=O | [structure] |
| 10 | [structure] | [structure] | [structure with CF₃] | [structure] |
| 11 | [structure] | [structure] | [structure with Cl] | [structure] |
| 12 | [structure] | [structure] | [structure with F] | [structure] |

EXAMPLES 17 TO 34

Employing the procedure described in Example 1, but substituting the starting material shown in column A of Table II below, the 3-one, oxime in column B is obtained; by reacting the 3-one, oxime with the compound shown in column C as per Example 5, the product shown in column D is obtained.

TABLE II

| Example number | Column A<br>Starting material | Column B<br>3 or 3'-one, oxime | Column C | Column D<br>Product |
|---|---|---|---|---|
| 17 | [structure: dibenzoxazepine with O-CH₃, Cl, CH₃ substituents, N-CH₂CH₂COOH] | [structure: oxime, =NOH] | Cl—C(=O)—NR¹R³<br>Cl—C(=O)—N(CH₃)₂ | [structure: product with (CH₃)₂N—C(=O)—O—N=] |
| 18 | [structure: dibenzothiazepine with S-CH₃, Cl, N-CH₂CH₂COOH] | [structure: oxime + isomer, =NOH] | Br—C(=S)—N(CH₃)C₂H₅<br>Br—C(=S)—N(CH₃)C₂H₅ | [structure: product with C₂H₅(CH₃)N—C(=S)—O—N=]<br>[structure: product with =N—O—C(=S)—N(CH₃)C₂H₅] |
| 19 | [structure: dibenzoxazepine with CF₃, S-CH₃, F₃C, Cl, N-CH₂CH₂COOH] | [structure: oxime, HON=] | Cl—C(=O)—N(CH₃)CH₂CH=CH₂ | [structure: product with CH₂=CHCH₂(CH₃)N—C(=O)—O—N=] |
| 20 | [structure: dibenzoxazepine with O-CH₃, CF₃, Cl, N-CH₂CH₂COOH] | [structure: oxime, HON=] | Cl—C(=O)—N(CH₃)CH₂C₆H₅ | [structure: product with C₆H₅CH₂(C₂H₅)N—C(=O)—O—N=] |

3,784,549

TABLE II—Continued

| Example number | Column A Starting material | Column B 3 or 3'-one, oxime | Column C | Column D Product |
|---|---|---|---|---|
| 21 | [structure] | [structure] | Cl—C(=S)—NRR' Br—C(=S)—N(C₄H₉)C₅H₁₁ | [structure] C₅H₁₁(C₄H₉)N—C(=S)—O—N= |
| 22 | [structure] | [structure] | Cl—C(=S)—N(CH₂C₆H₅)₂ | [structure] (C₆H₅CH₂)₂N—C(=S)—O—N= |
| 23 | [structure] | [structure] | Cl—C(=O)—NH₂ | [structure] H₂N—C(=O)—O—N= |
| 24 | [structure] | [structure] | Cl—C(=S)—N(C₂H₅)₂ | [structure] (C₂H₅)₂N—C(=S)—O—N= |
| 25 | [structure] | [structure] | Br—C(=O)—N(C₅H₁₁)CH₃ | [structure] CH₃(C₅H₁₁)N—C(=O)—O—N= |

3,784,549

TABLE II—Continued

| Example number | Column A | Column B | Column C | Column D |
|---|---|---|---|---|
| | Starting material | 3 or 3'-one, oxime | Cl—C(=Z)—NR¹R² | Product |
| 26 | [structure with O-CH₃, H₃C, C₅H₁₁S, Cl, OH, CH₂CH₂COOH] | [structure: 3-one oxime with O-CH₃, H₃C, C₅H₁₁S, Cl, OH, HON=] | Cl—C(=S)—N(C₂H₄Cl₂H₄)CH₃ | [structure with O-CH₃, H₃C, C₅H₁₁S, Cl, OH, N—C(=S)—O—N=, CH₃(C₂H₄Cl₂H₄)N—] |

TABLE IIa

| Example number | Column A | Column B | Column C | Column D |
|---|---|---|---|---|
| | Starting Material | 3 or 3'-one, oxime | Q—C(=Z)—N(CH₂)ᵣ with R³, X' | Product |
| 27 | [structure with O-CH₃, OH, CH₂CH₂COOH] | [structure: 3-one oxime with O-CH₃, OH, HON=] | Br—C(=O)—N(piperazine)—CH₂CH₂OH | [structure with O-CH₃, OH, N—C(=O)—O—N=, HOCH₂CH₂—N(piperazine)] |
| 28 | [structure with CH₃, C₂H₅, S—CH₃, H₃C, OH, CH₂CH₂COOH] | [structure: 3-one oxime with CH₃, C₂H₅, S—CH₃, H₃C, OH, =NOH] | Cl—C(=O)—N(ring) | [structure with CH₃, C₂H₅, S—CH₃, H₃C, OH, =NO—C(=O)—N(ring)] |
| 29 | [structure with CF₃, SC₂H₅, S—CH₃, H₃C, OH, CH₂CH₂COOH] | [structure: 3-one oxime with CF₃, SC₂H₅, S—CH₃, H₃C, OH, =NOH] | Br—C(=S)—N(ring) | [structure with CF₃, SC₂H₅, S—CH₃, OH, =NO—C(=S)—N(ring)] |

3,784,549

TABLE IIb

| Ex. No. | Column A<br>Starting Material | Column B<br>3 or 3'-one, oxime | Column C | Column D<br>Product |
|---|---|---|---|---|
| 30 | | | | |
| 31 | | | | |
| 32 | | | | |
| 33 | | | | |
| 34 | Same as above | Same as above | | |

What is claimed is:
1. A compound having the structure

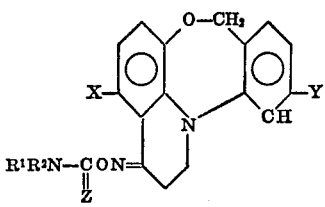

wherein Z is O or S; X and Y taken separately are each hydrogen or chloro, at least one of X and Y being hydrogen, $R^1$ and $R^2$ taken separately are the same or different and are each hydrogen, lower alkyl, phenyl, nitrophenyl, halophenyl, or di-(lower alkyl)-aminophenyl, wherein lower alkyl is an alkyl group having up to eight carbon atoms, and a non-toxic acid-addition salt thereof.

2. A compound in accordance with claim 1 wherein Z is O.

3. A compound in accordance with claim 1 wherein Z is S.

4. The compound in accordance with claim 1 having the structure

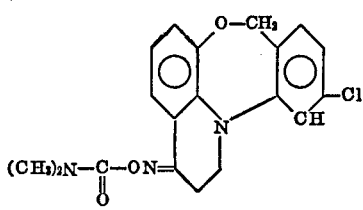

5. A compound having the structure

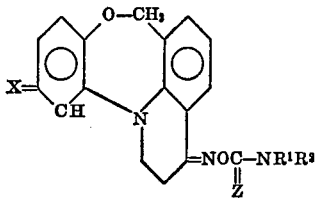

wherein Z is O or S; X is trifluoromethyl or chloro; $R^1$ and $R^2$ taken separately are the same or different and are each hydrogen, lower alkyl, phenyl, nitrophenyl, halophenyl, or di-(lower alkyl)-aminophenyl, wherein lower alkyl is an alkyl group having up to eight carbon atoms, and a non-toxic acid-addition salt thereof.

6. A compound in accordance with claim 5 wherein Z is S.

7. A compound in accordance with claim 5 wherein Z is O.

8. The compound in accordance with claim 5 having the structure

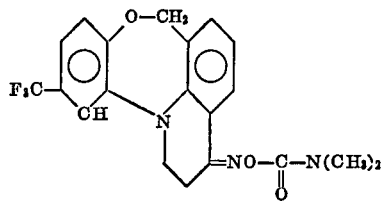

9. The compound in accordance with claim 5 having the structure

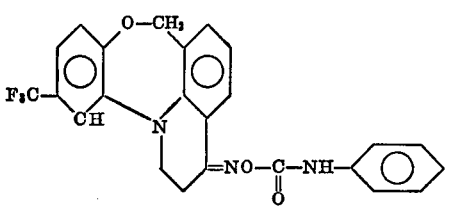

References Cited
UNITED STATES PATENTS
3,676,445   7/1972   Yale et al. _____ 260—288 R DONALD G. DAUS, Primary Examiner U.S. Cl. X.R.

260—213 B, 239 BC, 247.1, 247.2, 268 PC, 268 C, 283 CN, 283 S, 283 SY, 283 SA, 288 R, 327 B, 333, 999, 2938 S, 24388; 252—106